US008174991B1

(12) United States Patent
Trivedi

(10) Patent No.: US 8,174,991 B1
(45) Date of Patent: May 8, 2012

(54) METHODS AND APPARATUS RELATED TO ANALYSIS OF TEST PACKETS

(75) Inventor: Paras Trivedi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 207 days.

(21) Appl. No.: 12/493,742

(22) Filed: Jun. 29, 2009

(51) Int. Cl.
H04J 1/16 (2006.01)
(52) U.S. Cl. ........................................ 370/241; 714/732
(58) Field of Classification Search .......... 370/241–253; 714/732, 735, 736, 737, 738
See application file for complete search history.

(56) References Cited

U.S. PATENT DOCUMENTS

| | | | |
|---|---|---|---|
| 6,075,773 | A | 6/2000 | Clark et al. |
| 6,654,923 | B1 | 11/2003 | Grenier et al. |
| 6,795,402 | B1 | 9/2004 | Richardson et al. |
| 7,100,091 | B2 | 8/2006 | Nakamoto et al. |
| 7,184,408 | B2 | 2/2007 | Denton et al. |
| 7,222,255 | B1 | 5/2007 | Claessens et al. |
| 7,315,963 | B2 | 1/2008 | Luciani et al. |
| 7,356,077 | B2 | 4/2008 | Fala et al. |
| 7,391,736 | B2 | 6/2008 | Na et al. |
| 7,412,034 | B2 | 8/2008 | Rancu et al. |
| 7,489,641 | B2 | 2/2009 | Miller et al. |
| 7,826,381 | B1 * | 11/2010 | Kastuar et al. ............... 370/242 |
| 2002/0016708 | A1 | 2/2002 | Houh |
| 2002/0059545 | A1 * | 5/2002 | Nakashima et al. .......... 714/43 |
| 2002/0116675 | A1 * | 8/2002 | Gangl et al. ................... 714/732 |
| 2003/0156548 | A1 | 8/2003 | Sapp |
| 2003/0223376 | A1 * | 12/2003 | Elliott et al. ................... 370/249 |
| 2006/0262728 | A1 | 11/2006 | Addeo et al. |
| 2008/0052015 | A1 * | 2/2008 | Ozawa et al. .................. 702/57 |
| 2010/0061378 | A1 | 3/2010 | Joyner et al. |
| 2010/0228842 | A1 | 9/2010 | Kompella et al. |

OTHER PUBLICATIONS

Spirent Communications, "Packet Generator and Analyzer Base Package," P/N 79-000028 Rev.E May 2007, ©2007 Spirent Communications, Inc., 8 pages.
Spirent Communications, Abacus™ 50 T1 and E1, "T1 and E1 Traffic Generator Test System," P/N 79-000122 Rev.E Nov. 2007, ©2007 Spirent Communications, Inc., 4 pages.
U.S. Appl. No. 12/464,325, filed May 12, 2009, entitled "Methods and Apparatus Related to Packet Generation and Analysis," 30 pages.
S. Amante et al. "Operations and Maintenance Next Generation Requirements" ©The IETF Trust, (Feb. 18, 2008), 22 pages.

(Continued)

Primary Examiner — Ricky Ngo
Assistant Examiner — Kan Yuen
(74) Attorney, Agent, or Firm — Cooley LLP

(57) ABSTRACT

In one embodiment, a processor-readable medium storing code representing instructions that when executed by a processor cause the processor to store a set of stream signatures representing a set of test streams. The code can be configured to cause the processor to receive at a test device a stream signature from a test packet after the test packet has been processed at a device-under-test. The test packet can emulate at least a portion of network traffic. The code can also be configured to cause the processor to define an indicator representing that the test packet is from a new test stream when the stream signature from the test packet is different than each stream signature from the set of stream signatures. The new test stream is excluded from the set of test streams.

19 Claims, 4 Drawing Sheets

OTHER PUBLICATIONS

P. Pan et al. "Fast Reroute Extensions to RSVP-TE for LSP Tunnels," Standards Track, ©The Internet Society (May 2005), 38 pages.

Office Action mailed Dec. 8, 2010 for U.S. Appl. No. 12/464,325 (8 pages).

* cited by examiner

METHODS AND APPARATUS RELATED TO ANALYSIS OF TEST PACKETS

BACKGROUND

Embodiments described herein relate generally to equipment for testing one or more components of a network, and, in particular, to methods and apparatus related to analysis of test packets.

As networks have increased in size, complexity, and processing speed, assessing the capabilities of these networks using known testing platforms may not always be feasible. For example, many known testing platforms lack the port density to adequately test relatively large data center networks that can have hundreds of gigabit Ethernet ports. Some known scalable testing platforms that can be configured to test such large data center networks can consume undesirable levels of energy, can be prohibitively expensive, and/or can lack the flexibility desired to adequately test the data center networks.

Thus, a need exists for methods and apparatus related to test packet analysis configured to address the shortfalls of existing testing platforms.

SUMMARY

In one embodiment, a processor-readable medium storing code representing instructions that when executed by a processor cause the processor to store a set of stream signatures representing a set of test streams. The code can be configured to cause the processor to receive at a test device a stream signature from a test packet after the test packet has been processed at a device-under-test. The test packet can emulate at least a portion of network traffic. The code can also be configured to cause the processor to define an indicator representing that the test packet is from a new test stream when the stream signature from the test packet is different than each stream signature from the set of stream signatures. The new test stream is excluded from the set of test streams.

DETAILED DESCRIPTION

Figure 1:
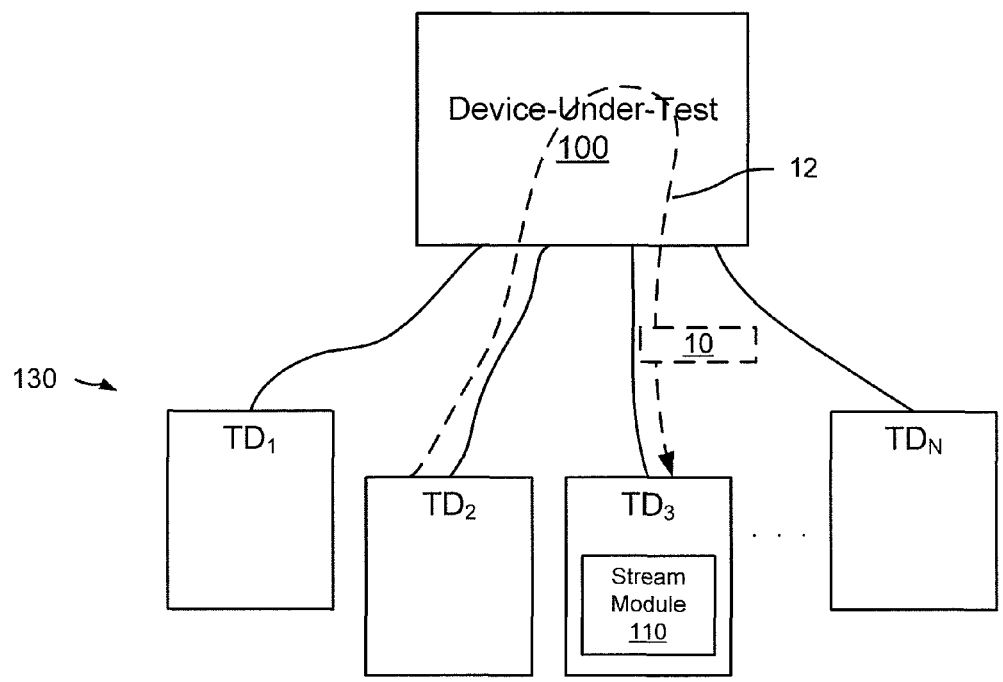
FIG. 1 is a schematic diagram that illustrates test devices in communication with a device-under-test, according to an embodiment.

In an embodiment, a test device can be configured to receive test packets from a stream of test packets after the test packets have been processed at a device-under-test (DUT). The test device can be configured to determine whether or not the stream of test packets (also can be referred to as a test stream) is a new stream of test packets based on information (e.g., a signature) included in one or more of the test packets from the stream of test packets. In some embodiments, the stream of test packets can be associated with, for example, a testing sequence. The test device can be configured to determine (e.g., detect) whether or not the test stream is a new test stream without being notified by, for example, another test device or a management device that the test stream is being sent to the test device, that the test stream is a new test stream, and/or so forth. In other words, the test device can be configured to discover new test streams in an independent and distributed manner rather than being pre-programmed with, for example, a list of expected test stream(s) before a testing sequence (that includes the test stream(s)) is commenced and/or during execution of the testing sequence. In some embodiments, the test device can be (or can be included in) a packet generator, and can be referred to as such.

In some embodiments, a test device can be configured to discover one or more new test streams based on one or more conditions being satisfied. In some embodiments, a test device can be configured to discover new test streams based on a set of stream signatures (e.g., a locally stored set of stream signatures) associated with existing test streams. An existing test stream can be a test stream known at and/or already being received at a test device. In other words, an existing test stream can be a test stream that is registered at the test device. A stream signature can be an identifier (e.g., origin identifier) or set of identifiers that can be used to uniquely represent a test stream. The stream signature can be included in each test packet defining at least a portion of a test stream (e.g., a new test stream, an existing test stream). Accordingly, the stream signature can be used to identify whether or not a test packet is associated with a test stream. In some embodiments, the stream signature can be defined based on one or more portions of information (e.g., bit values) included, for example, a field of a test packet. In some embodiments, a test stream can be a series of test packets (or cells) from a source device (e.g., a single source device, a source test device) and/or can be associated with a session (e.g., a communication sessions).

For example, in some embodiments, a test device can be configured to determine that a new test stream is being received at the test device when a stream signature from (e.g., extracted from) a test packet does not match (e.g., is absent from) any stream signature from a set of stream signatures associated with existing test streams. In other words, the test device can be configured to determine that a new test stream is being received when a match condition is unsatisfied. In some embodiments, the test device can be configured to define an indicator that a new stream is being received at the test device in response to the match condition being unsatisfied.

In some embodiments, a test device can be configured to determine, based on test streams processed at a device-under-test and received at the test device, whether or not processing at the device-under-test is being performed in a desirable fashion. In some embodiments, processing of a test stream (after the test stream has been discovered) can be tracked using a state value associated with the test stream. For example, a test device can be configured to determine that one or more test packets associated with a stream have been misprocessed (e.g., processed out of order, erroneously dropped) at a device-under-test based on sequence values associated with the test packet(s).

FIG. 1 is a schematic diagram that illustrates test devices 130 in communication with a device-under-test 100, according to an embodiment. The test devices 130 can be configured to define and/or send test packets to the device-under-test 100. In addition, the test devices 130 can be configured to receive and/or analyze (or trigger analysis of) the test packets after the test packets have been processed at the device-under-test 100. In some embodiments, the test devices 130 can be referred to as packet generators, and in some embodiments, the device-under-test 100 can be referred to as a target entity.

The processing capabilities of the device-under-test 100 can be determined (e.g., assessed) based on an analysis of the test packets after the test packets have been processed at the device-under-test 100. Accordingly, the test devices 130 are configured to define, send, receive, and/or analyze (or trigger analysis of) test packets that can be used to calculate one or more test parameter values related to a processing capability of the device-under-test 100. For example, test packets can be defined and sent to the device-under-test 100 to determine the processing speed of the device-under-test 100, the processing capacity of the device-under-test 100, the processing behavior of the device-under-test 100 with respect to a profile of test packets (e.g., a burst of test packets, a group of test packets emulating a particular type of network traffic), and/or so forth.

One or more test packets (e.g., stream of test packets, a test packet similar to test packet 10) defined at one or more of the test devices 130 can include data (e.g., bit values) that can be used to analyze the processing capabilities of the device-under-test 100. For example, the test packet(s) can be defined so that they include a portion that emulates a particular type of network traffic. In some embodiments, the test packet(s) can be configured to emulate interne protocol (IP) network traffic. Accordingly, one or more of the test packets can have a header, a payload, and a trailer that is defined based on an IP protocol associated with any layer of the open systems interconnection (OSI) model. For example, one or more of the test packets defined by the test devices 130 can be related to stateful, application layer traffic (e.g., related to layer-5 of the OSI model). In some embodiments, one or more portions of test packets defined by the test devices 130 can include randomly generated data portions (e.g., randomly generated data payloads) and/or can be addressed to specified entities (e.g., one of the test devices 130). For example, in some embodiments, address values and/or payloads of test packets by the test devices 130 can be defined based on variations of a pseudo-random number. The test devices 130 can be configured to define the test packet(s) so that each of the test packet(s) is unique (e.g., has a unique signature or unique identifier) within a specified domain, and thus, can be tracked by the test devices 130. In some embodiments, one or more of the test devices (e.g., test device $TD_3$) may not define an egress test packet during a specified testing cycle (or testing time period).

In some embodiments, one or more test packets can be defined at, for example, one or more packet generation modules (not shown in FIG. 1) of the test devices 130. In some embodiments, one or more functions associated with the packet generation module can be included in the stream module 110 and/or one or more functions associated with the stream module 110 can be included in the packet generation module. More details related to packet generation modules are described in a co-pending U.S. patent application Ser. No. 12/464,325, filed May 12, 2009, entitled, "Methods and Apparatus Related to Packet Generation and Analysis," which is incorporated herein by reference in its entirety.

The device-under-test 100 is referred to as a device-under-test because it is a target of testing performed by the test devices 130. In some embodiments, the scale of the device-under-test 100 can vary from a single network switch to an entire network having multiple switches, routers, and/or service layer devices. In some embodiments, the test packets (e.g., a group of test packets) can be referred to as test traffic or as test network traffic. The test packets can be configured to emulate actual network traffic (e.g., a burst of packets, a denial of service attack) that could be defined by, for example, a server device (e.g., a host device), a data storage device, a router, and/or so forth. In some embodiments, test devices (such as those shown in FIG. 1) can be configured to collectively produce, send (to a device-under-test), receive (from a device-under-test), and/or analyze, for example, several terabits per second of test network traffic.

In some embodiments, the device-under-test 100 can be any type of entity configured to receive and process packets including test packets. In one embodiment, the device-under-test 100 can be, for example, a distributed switch/router based around a multi-stage switch fabric (e.g., 3-stage switch fabric, 5-stage switch fabric). For example, although not shown, the switch fabric can include an ingress stage, a middle stage, and an egress stage. In some embodiments, the switch fabric can be a reconfigurably (e.g., a re-arrangeably) non-blocking switch fabric and/or a time-division multiplexed switch fabric. In some embodiments, the switch fabric can be included within a data center network (e.g., a core portion of a data center network). Specifically, the switch fabric can define a core portion of the data center network, which can include a network or interconnection of devices. In some embodiments, the switch fabric can be defined based on a Clos network architecture (e.g., a strict sense non-blocking Clos network, a Benes network) that forms the data plane for a distributed switch/router system that can be included in (or can define) the core of a data center network. In some embodiments, one or more peripheral processing devices (e.g., a compute node, a storage node, a service node and/or a router) and/or other network devices, which can be operatively coupled to the data center network, can be emulated by the test devices 130. More details related to a switch fabric are set forth in co-pending U.S. patent application Ser. No. 12/414,825, filed Mar. 31, 2009, entitled, "Distributed Multi-Stage Switch Fabric," co-pending U.S. patent application Ser. No. 12/345,502, filed Dec. 29, 2008, entitled, "Methods and Apparatus Related to a Modular Switch Architecture," and co-pending U.S. patent application Ser. No. 12/345,500, filed Dec. 29, 2008, entitled, "System Architecture for a Scalable and Distributed Multi-Stage Switch Fabric," all of which are incorporated herein by reference in their entireties.

The test devices 130 include test device $TD_1$ through test device $TD_N$. In some embodiments, the test devices 130 can include more or less test devices than those shown in FIG. 1. As illustrated by path 12 in FIG. 1, a test packet 10 defined at test device $TD_2$ can be sent to the device-under-test 100. The test device $TD_2$ can be referred to as a source test device because the test packet 10 is defined at the test device $TD_2$ and sent in an egress direction (away from the source test device) to the device-under-test 100. After processing of the test packet 10 at the device-under-test 100 is completed, the test packet 10 can be received at test device $TD_3$. The test device $TD_3$ can be referred to as a destination test device because the test packet 10 is received at the test device $TD_3$ after being processed at the device-under-test 100. The test packet 10 is an ingress test packet being received at the destination test device $TD_3$ from the device-under-test 100. As shown in FIG. 1, the test device $TD_3$ is separate from (e.g., distinct from) test device $TD_2$.

The test device $TD_3$ has a stream module 110 configured to determine whether or not the test packet 10 is associated with an existing stream of test packets (e.g., a stream of test packets already being received at the test device $TD_3$, a stream of test packets already registered at the test device $TD_3$) or is associated with a new stream of test packets (e.g., a stream of test packets that is new from the perspective of the test device $TD_3$, a stream of test packets not already registered at the test device $TD_3$). In some embodiments, the test packet 10 can be from a beginning portion of the stream of test packets. For example, the test packet 10 can be a leading test packet from the stream of test packets. Although not shown in FIG. 1, in some embodiments, one or more of the test devices 130 can include a stream module such as stream module 110 included in test device $TD_3$.

In some embodiments, the stream module 110 of the test device $TD_3$ can be configured to determine whether test packet 10 is associated with a new test stream based on one or more conditions being satisfied. For example, the stream module 110 can be configured to determine that the test packet 10 is associated with a new test stream when a stream signature from (e.g., extracted from) the test packet 10 does not match a stream signature from a set of stream signatures associated with existing test streams. The existing test streams can be test streams already known at (e.g., registered at) and/or being received at the test device $TD_3$. In some embodiments, the test device $TD_3$ (e.g., the stream module 110 of the test device $TD_3$) can be configured to define an indicator that the test packet 10 is from a new stream being received at the test device $TD_3$ in response to the match condition being unsatisfied. If the stream signature from the test packet 10 matches a stream signature associated with an existing stream, the test device $TD_3$ can be configured to define an indicator that the test packet 10 is associated with an existing stream already being received at the test device $TD_3$.

In some embodiments, the stream module 110 can have a stream processor and a memory. A stream table that includes information representing stream signatures associated with existing test streams can be stored in the memory. In some embodiments, the stream table can be referred to as a stream registration table. The stream processor can be configured to process the stream signature of the test packet 10 and the stream signatures stored in the stream table based on one or more conditions (e.g., a match condition). A schematic diagram of a stream module is shown in FIG. 2.

Figure 2:
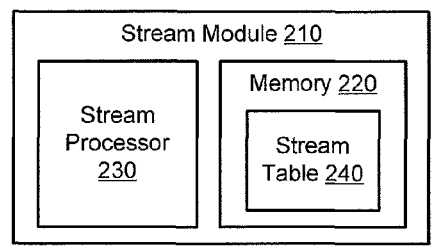
FIG. 2 is a schematic diagram of a stream module that includes a stream processor and a memory, according to an embodiment.

FIG. 2 is a schematic diagram of a stream module 210 that includes a stream processor 230 and a memory 220, according to an embodiment. As shown in FIG. 2, a stream table 240 is stored in the memory 220. Specifically, the stream table 240 can include information representing stream signatures associated with test streams being received at a test device (such as test device $TD_3$ shown in FIG. 1). The stream processor 230 can be configured to compare a stream signature extracted from a test packet received at the test device with the stream signatures stored in the stream table 240. The stream processor 230 can be configured to define an indicator representing that the test packet is associated with a new test stream when the stream signature of the test packet is absent from the stream table 240. More details related to a stream table are described in connection with FIG. 3.

In some embodiments, the stream module 210 can include or can be a general purpose processing component (not shown in FIG. 2) such as a general purpose central processing unit (CPU). In some embodiments, the memory 220 can include or can be a general purpose memory component (e.g., a static random-access memory (SRAM)) that can be accessed by the general purpose processing component. In some embodiments, for example, the stream module 210 can include a multi-core processing system. In some embodiments, the stream module 210 can be included in a packet generation module that includes a general purpose memory component and/or a general purpose memory component. More details related to packet generation modules that include general purpose components are described in a co-pending U.S. patent application Ser. No. 12/464,325, filed May 12, 2009, entitled, "Methods and Apparatus Related to Packet Generation and Analysis," which has been incorporated herein by reference in its entirety.

Referring back to FIG. 1, in some embodiments, one or more portions of the test devices 130 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with, for example, the stream module 110 can be included in different modules and/or combined into one or more modules. In some embodiments, one or more of the test devices 130 can be included in one or more physical units. For example, more than one of the test devices 130 shown in FIG. 1 can be included in the same rack-mountable 1U unit.

Each test device from the test devices 130 can be configured to process test packets independent of processing being performed at other test devices from the test devices 130. For example, the test device $TD_3$ can be configured to process test packet 10 independent from processing of other test packets performed at, for example, test device $TD_N$. The test device $TD_3$ (or stream module 110 within the test device $TD_3$) can process test packet 10 (and other test packets related to test packet 10 within a test stream) while ignoring test packets sent to and processed at the test device $TD_N$. Although not shown, in some embodiments, a first stream module within a test device (such as test device $TD_1$) can be configured to operate independent of a second stream module within the same test device. Specifically, each of the stream modules can be configured to register different (e.g., mutually exclusive) or overlapping sets of test streams. The stream modules can be configured to independently (and/or in parallel) receive and/or register the test streams.

As shown in FIG. 1, test device $TD_3$ and test device $TD_N$ are in communication with the device-under-test 100 via parallel links. Accordingly, the test device $TD_3$ and the test device $TD_N$ can receive and process packets in parallel (and independent of one another). For example, test device $TD_2$ and test device $TD_3$ can each receive and process test streams in parallel from test device $TD_1$. Specifically, test device $TD_2$ can receive test packets defining a first test stream from test device $TD_1$ and test device $TD_3$ can receive test packets defining a second test stream from test device $TD_1$. The test device $TD_2$ can receive test packets from the first test stream without registering the second test stream or being notified of the first test stream before test packets are sent to the test device $TD_2$.

In some alternative embodiments, each of the test devices 130 can be operably coupled to device-under-test 100 via more than one connection (e.g., physical connection, wireless connection). Accordingly, each of the test devices 130 can be configured to send (e.g., stream) test packets to the device-under-test 100 and/or receive test packets from the device-under-test 100 via their respective multiple connections. For example, test device $TD_2$ can be configured to define and send test packets associated with a first test stream via a first connection while receiving and analyzing test packets associated with a second test stream via a second connection. In some embodiments, the second connection can be separate from and parallel to the first connection.

Although not shown in FIG. 1, in some embodiments, one or more of the test devices 130 can include a switch device. The switch device(s) can be configured to manage the transmission and analysis of test packets defined within the test devices 130. For example, test packets (e.g., egress test packets) defined at test device TD₃ can be routed to the device-under-test 100 using a switch device, and the test packet 10 received at the test device TD₃ can be forwarded to the stream module 110 via the switch device. More details related to the functionality of a switch device are described in connection with FIG. 5, and in a co-pending U.S. patent application Ser. No. 12/464,325, filed May 12, 2009, entitled, "Methods and Apparatus Related to Packet Generation and Analysis," which has been incorporated herein by reference in its entirety.

Figure 3:
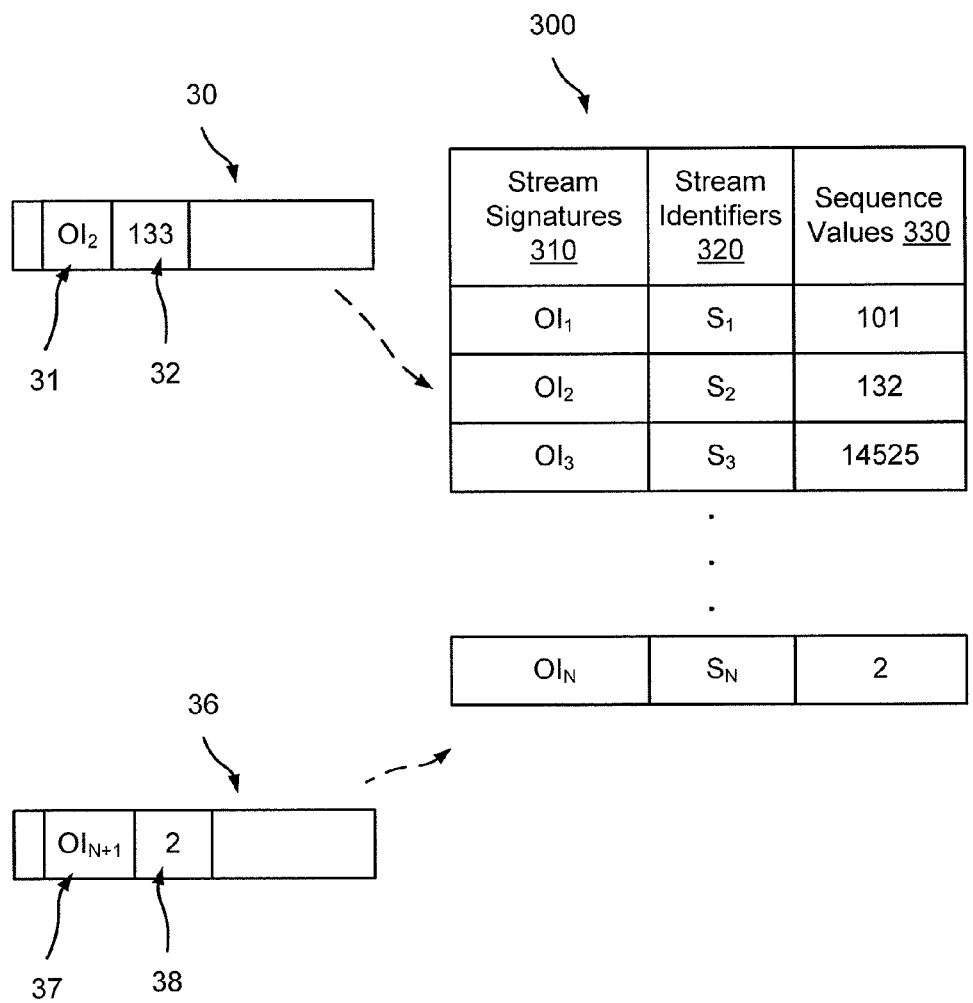
FIG. 3 is a schematic diagram that illustrates a stream table, according to an embodiment.

FIG. 3 is a schematic diagram that illustrates a stream table 300, according to the invention. As shown in FIG. 3, the stream table 300 includes stream signatures 310, stream identifiers 320, and sequence values 330. In some embodiments, the stream table 300 can be stored at a memory of a stream module of a test device (such as stream modules shown in FIGS. 1 and 2). In some embodiments, the stream table 300 can be locally stored and locally managed at the test device.

As shown in FIG. 3, the stream signatures 310 include stream identifiers $OI_1$ through $OI_N$. The stream signatures 310 can be, or can include, any type of identifier that can be used to uniquely identify a test stream or determine whether or not a test packet is associated with a test stream. In some embodiments, each origin identifier included in the stream signatures 310 can represent a location where a test stream is defined. For example, stream signature $OI_1$ can be a media access control (MAC) address value that represents a source test device where test packets that define at least a portion of a test stream are defined.

In some embodiments, if multiple test streams (e.g., parallel test streams) are being sent from (e.g., transmitted from) a particular location (e.g., a particular source test device) during a time period, an additional parameter value can be used to uniquely identify each test stream. For example, the stream signatures 310 can be (or can include) a MAC address value and a port number from which a test stream is being sent. In some embodiments, one or more of the stream signatures 310 can be a concatenation of the MAC address value and the port number.

As shown in FIG. 3, the stream identifiers 320 include stream identifiers $S_1$ through $S_N$. The stream identifiers 320 can be labels that represent unique test streams. For example, stream identifier $OI_2$ can be an identifier used to uniquely identify a test stream represented by stream identifier $S_2$. In some embodiments, the stream identifiers 320 can be defined by a stream module at a test device. In some alternative embodiments, the stream table 300 does not include the stream identifiers 320. The test streams can instead be identified based on (e.g., based only on) the stream signatures 310.

As shown in FIG. 3, each of the stream signatures 310 and stream identifiers 320 are associated with a sequence value (shown in column 330) that represents a state of the test stream. Specifically, each sequence value from the sequence values 330 is a sequence value of the most recently received (e.g., the last received) test packets associated with each test stream. For example, sequence value 101 (shown in column 330) can represent a sequence value of the most recently received test packet associated with a test stream represented by stream identifier $S_1$. The sequence value 101 can represent an order of the most recently received test packet with respect to other test packets from the test stream. In some embodiments, the sequence value can be a sequence value defined at a source test device for inclusion in the test packet.

As shown in FIG. 3, test packet 36 has a stream signature $OI_{N+1}$ (shown at 37) and a sequence value of 2 (shown at 38). The test packet can be defined at a source test device, and the test packet 36 can be received at a destination test device after being processed at, for example, a device-under-test. As shown in FIG. 3, the stream signature $OI_{N+1}$ from (e.g., extracted from) the test packet 36 is different than any of the stream signatures 310 included in the stream table 300. In other words, the stream signature $OI_{N+1}$ from the test packet 36 does not match any of the stream signatures 310, or is absent from stream table 300. Accordingly, the test packet 36 can be identified as being associated with a new test stream rather than one of the existing test streams represented within the stream table 300. In other words, the test packet 36 is from an unregistered test stream. In some embodiments, a stream signature may be added to a stream table (such as stream table 300) when a specified number (or more than a specified number) of test packets (e.g., consecutive test packets) having the stream signature are received.

In some embodiments, a test packet used to identify a new test stream can be referred to as a leading test packet. In other words, the leading test packet is the first test packet (or initial test packet) from a test stream received at a destination test device. The leading test packet can be the first test packet associated with a test stream that is unregistered at the destination test device. In some embodiments, the test packet 36 can be a leading test packet of the new test stream. In some embodiments, test packets received at a destination test device subsequent to a leading test packet can be referred to as subsequent test packets (or as trailing test packets).

In some embodiments, although the leading test packet is the first test packet (e.g., initial test packet) from a new test stream that is received at a destination test device, the leading test packet may not be the first test packet defined at a source test device for the new test stream. For example, a first test packet of a test stream can be defined at a source device a first time and a second test packet of the test stream can be defined at the source device at a second time after the first time. The first test packet and the second test packet can define a test stream. The first test packet can be sent from the source device to a device-under-test before the second test packet is sent from the source device to the device-under-test. Because processing of the first test packet at the device-under-test can take longer than processing of the second test packet at the device-under-test, the second test packet can be sent from the device-under-test to a destination test device before the first test packet is sent from the device-under-test to a destination test device. Accordingly, the second test packet can be a leading test packet used to identify the test stream as a new test stream. In some embodiments, the first test packet may be dropped (e.g., dropped in a lossy fashion) after being received at the destination test device (and not included in an analysis related to the test stream) because the first test packet was defined before the second test packet.

In response to the test packet 36 being identified as a test packet from a new test stream, the stream signature $OI_{N+1}$ can be added to the stream table 300. The new test stream, upon being identified and added to the stream table 300, can be characterized as an existing test stream. In other words, the new test stream will be registered because the stream signature $OI_{N+1}$ will be added to the stream table 300. Test packets subsequent to test packet 36 (e.g., test packets received at a test device after test packet 36 has been received at the test device) that have the stream signature $OI_{N+1}$ can be matched to the entry in the stream table 300 associated with stream signature $OI_{N+1}$ (after the stream signature $OI_{N+1}$ has been added to the stream table 300). Accordingly, the subsequent test packets (test packets subsequent to test packet 36) can be identified as being associated with an existing (or registered) test stream.

As shown in FIG. 3, test packet 30 has a stream signature $OI_2$ (shown at 31) and a sequence value of 133 (shown at 32). The stream signature $OI_2$ from the test packet 30 can be identified as being associated with the test stream represented by the stream identifier $S_2$ because the stream signature $OI_2$ from the test packet 30 matches the stream signature $OI_2$ (shown in column 310) included in the stream table 300. In other words, the test packet 30 can be associated with an existing test stream already represented in the stream table 300. The stream signatures $OI_2$ (shown at 31) and/or the sequence value of 133 (shown at 32) can be included in any portion (e.g., a header portion, a payload portion) of the test packet 30.

In some embodiments, an expected sequence value of a next test packet can be determined based on the stream table 300. For example, a stream processor can be configured to determine, based on the stream table 300, that the most recently received test packet (can also be referred to as a last received test packet) received at a test device (not shown) from a test stream represented by the stream identifier $S_2$ (shown in column 320) had a sequence value of 132 (shown in column 330). In other words, the stream processor can be configured to determine the state (e.g., current state) of the test stream based on the sequence value stored in the stream table 300. The stream processor can be configured to determine, assuming sequential numbering, that the next test packet from the test stream represented by the stream identifier $S_2$ should have a sequence value of 133. In some embodiments, an expected sequence value can be calculated based on an algorithm and need not be sequential.

As shown in FIG. 3, the sequence value of 133 (shown at 32) included in the test packet 30 matches the expected sequence value of 133 (which can be determined based on the entries included in stream table 300). Accordingly, a stream processor, for example, can be configured to define an indicator (e.g., a signal) representing that the sequence value 133 of the test packet 30 matches the expected sequence value of 133. In some embodiments, an indicator representing a satisfied match condition may be defined after a specified number of test packets (e.g., a specified number of consecutive test packets) associated with a series of sequence values matches a series of expected sequence values.

If a sequence value of a test packet does not match an expected sequence value for a test stream represented within table 300, a stream processor, for example, can be configured to define an indicator (e.g., a signal) representing that the sequence value of the test packet does not match the expected sequence value. For example, although not shown, if the sequence value of test packet 30 were 134 (rather than 133), a stream processor can be configured to define an indicator representing that the sequence value of the test packet does not match the expected sequence value of 133. The sequence value of 134 of the test packet 30 may have been, for example, processed out of order at a device-under-test, and may have arrived at the stream processor before a test packet that includes the sequence value of 133. In some embodiments, an indicator representing a unsatisfied match condition may only be defined after a specified number of test packets (e.g., a specified number of consecutive test packets) associated with a series of sequence values does not match a series of expected sequence values.

For example, a first test packet of a test stream can be defined at a source device a first time and a second test packet of the test stream can be defined at the source device at a second time after the first time. The first test packet can include a first sequence value and the second test packet can include a second sequence value (that is sequentially after the first sequence value). The first test packet and the second test packet can collectively define at least a portion of a test stream. The first test packet can be sent from the source device to a device-under-test before the second test packet is sent from the source device to the device-under-test. The second test packet can be sent from the device-under-test to a destination test device after being processed at the device-under-test, but the first test packet may not be sent from the device-under-test because the first test packet was dropped at the device-under-test due to, for example, a processing error. Based on the state of the test stream, the destination test device may have expected to receive a test packet with the first sequence value, but instead received the second test packet with the second sequence value because the first test packet was dropped at the device-under-test. Accordingly, the destination test device can be configured to define an indicator that a processing error has occurred at the device-under-test because the second sequence value does not match an expected sequence value.

In some embodiments, the stream table 300 can be updated based on a sequence value included in (and extracted from) a test packet. For example, the sequence value 132 (shown in column 330) can be updated with the sequence value 133 (shown at 32) in response to the test packet 30 being received. In some embodiments, the stream table 300 can be updated regardless of the sequence value in a test packet matching an expected sequence value. For example, if a sequence value of a test packet of a test stream does not match an expected sequence value of the test stream determined based on entries included in a stream table, the stream table can be updated to include the sequence value of the test packet so that the actual state of the test stream (regardless of potential processing errors) can be reflected in the stream table. In some embodiments, a stream table can be updated to include a sequence value of a test packet of a test stream only if the sequence value of the test packet is greater than or equal to an expected sequence value associated with the test stream.

In some embodiments, a state value can be any value (or can be from any series of values) that can be used to determine (e.g., predictably determine) whether or not processing at the device-under-test has been properly performed. In some embodiments, a state of a test stream can be represented by a value different than a sequence value such as the sequence values 330 shown in FIG. 3. For example, a state of a test stream can be represented based on timestamp information extracted from test packets from the test stream. The timestamp information from can be used to determine whether or not processing at a device-under-test has been performed in a desirable fashion. In some embodiments, a state value can be calculated based on an algorithm, and a series of state values may not be sequential numbers (or values).

As shown in FIG. 3, each test stream is associated with a single entry (e.g., row entry) in the stream table 300. For example, the test stream represented by stream identifier $OI_1$ (shown in column 310) is associated with a single stream identifier $S_1$ (shown in column 320) and a single sequence value of 101 (shown in column 330). In some alternative embodiments, a history of sequence values 330 can be stored in the stream table 300. For example, sequence values from the last three most recently received test packets associated with a test stream represented by stream signature $OI_1$ (shown in column 310) can be extracted from the test packets and stored in the stream table 300. These sequence values can be associated with the stream signature $OI_1$, and can be used to analyze subsequently received test packets.

Figure 4:
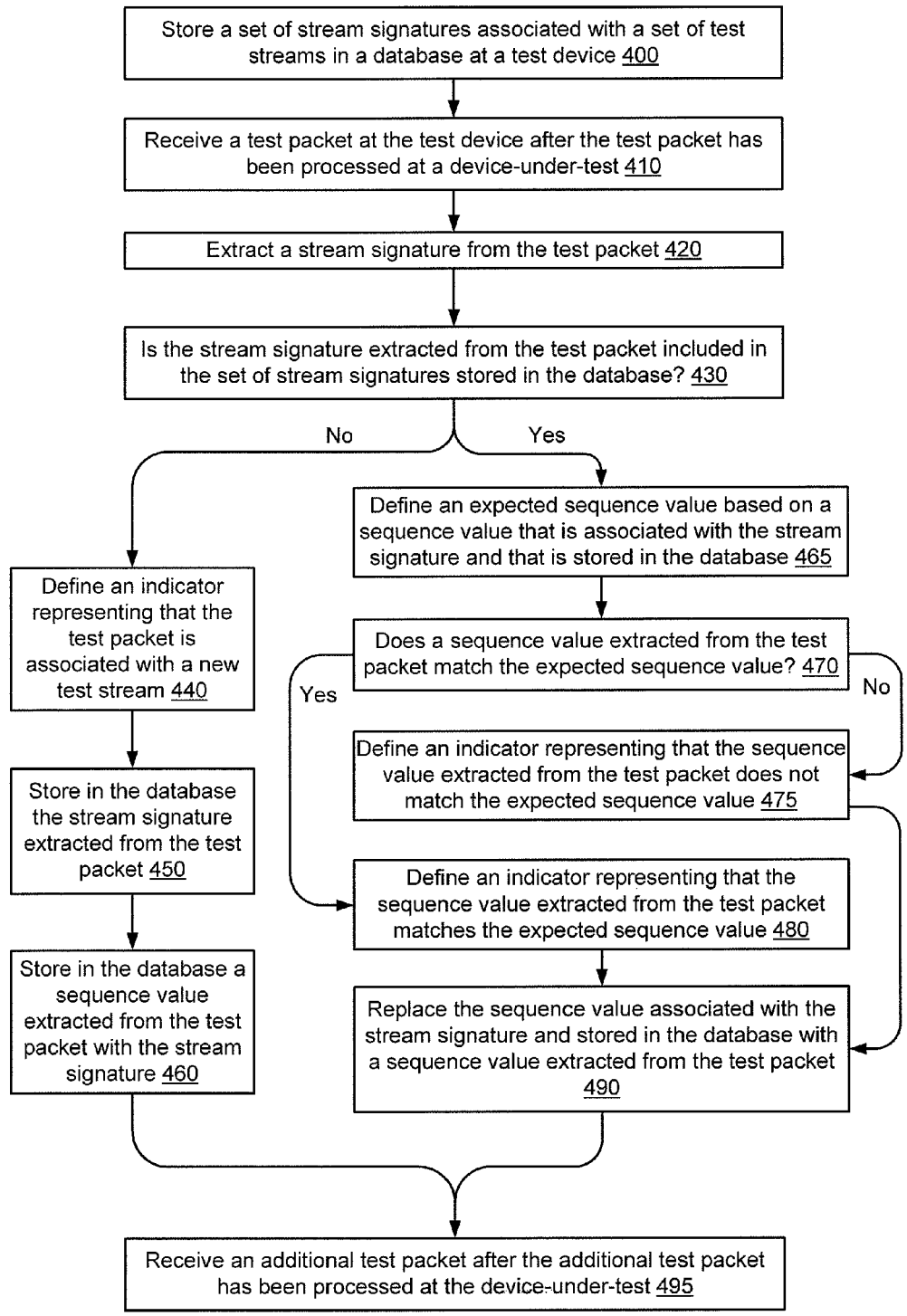
FIG. 4 is a flowchart that illustrates a method for processing a stream signature associated with a test packet, according to an embodiment.

FIG. 4 is a flowchart that illustrates a method for processing a stream signature associated with a test packet, according to an embodiment. As shown in FIG. 4, a set of stream signatures associated with a set of test streams is stored in a database at a test device, at 400. For example, the set of stream signatures associated with the set of test streams can be included in a stream table. In some embodiments, one or more stream signatures from the set of stream signatures can be associated with test stream(s) (from the set of test streams) discovered (and not pre-programmed) at the test device and stored in the database after being discovered at the test device. In some embodiments, each test stream can be represented by a single entry, or multiple entries, within the stream table. In some embodiments, each test stream can be uniquely represented by a stream signature.

A test packet is received at the test device after the test packet has been processed at a device-under-test, at 410. The test device can be a destination test device, and the test packet can be defined at a source test device. In some embodiments, the test packet can be referred to as an ingress test packet.

A stream signature can be extracted from the test packet, at 420. In some embodiments, the stream signature can be an identifier (e.g., origin identifier) or set of identifiers that can be used to uniquely represent a test stream. The stream signature can be defined based on one or more portions of information (e.g., bit values) included in one or more fields of the test packet.

If the stream signature extracted from the test packet is not included in the set of stream signatures stored in the database (as determined at block 430), an indicator representing that the test packet is associated with a new test stream is defined, at 440. In some embodiments, the stream signature can be used to uniquely identify the new test stream. The indicator can be stored at the test device and used in an analysis or reporting related to test packet processing performed at the device-under-test.

The stream signature extracted from the test packet is stored in the database, at 450, and a sequence value extracted from the test packet is stored in the database with the stream signature, at 460. In some embodiments, any type of state value that represents a state of the new test stream can be stored with the stream signature. In some embodiments, the state value can be used to track processing of the new test stream at a device-under-test.

If the stream signature extracted from the test packet is included in the set of stream signatures stored in the database (as determined at block 430), an expected sequence value is defined (e.g., calculated) based on a sequence value that is associated with the stream signature, and that is stored in the database, at 465. The stream signature can represent an existing test stream that is, for example, registered at the test device. Accordingly, the test packet can define at least a portion of the existing test stream. The sequence value can be from a test packet (from the existing test stream) received at the test device before the test packet is received at the test device. In some embodiments, the test packet can be the last test packet received at the test device before (e.g., immediately before) the test packet is received at the test device.

If a sequence value extracted from the test packet does not match the expected sequence value (as determined at block 470), an indicator representing that the sequence value extracted from the test packet does not match the expected sequence value is defined, at 475. In some embodiments, the indicator can be stored at (e.g., logged at) the test device and used in an analysis or reporting related to test packet processing performed at the device-under-test. In some embodiments, the indicator can represent that the test packet has been processed at the device-under-test out of order with respect to another test packet from an existing test stream represented by the stream signature.

If a sequence value extracted from the test packet matches the expected sequence value (as determined at block 470), an indicator representing that the sequence value extracted from the test packet matches the expected sequence value is defined, at 480. The indicator can be stored at (e.g., logged at) the test device and used in an analysis or reporting related to test packet processing performed at the device-under-test. In some embodiments, the indicator can represent that the test packet has been processed at the device-under-test in a desirable fashion.

The sequence value associated with the stream signature and stored in the database is replaced with a sequence value extracted from the test packet, at 490. As shown in FIG. 4, the sequence value stored in the database can be replaced with the sequence value extracted from the test packet whether or not the sequence value extracted from the test packet matches the expected sequence value.

An additional test packet is received after the additional test packet has been processed at the device-under-test, at 495. In some embodiments, the additional test packet can be from the same test stream as the test packet described in blocks 410 through 490. Processing of the additional test packet can be performed in accordance with blocks 420 through 490 (similar to the manner in which the test packet was processed). In some embodiments, any test packets received at the test device can be processed in accordance with blocks 420 through 490.

In some embodiments, portions of the flowchart illustrated in FIG. 4 can be performed in a different order. In some embodiments, for example, an expected sequence value can be defined (block 465) before the determination related to the stream signature from the test packet (block 430). In some embodiments, all or a portion of the flowchart illustrated in FIG. 4 can be performed at, for example, a stream module of a test device.

Figure 5:
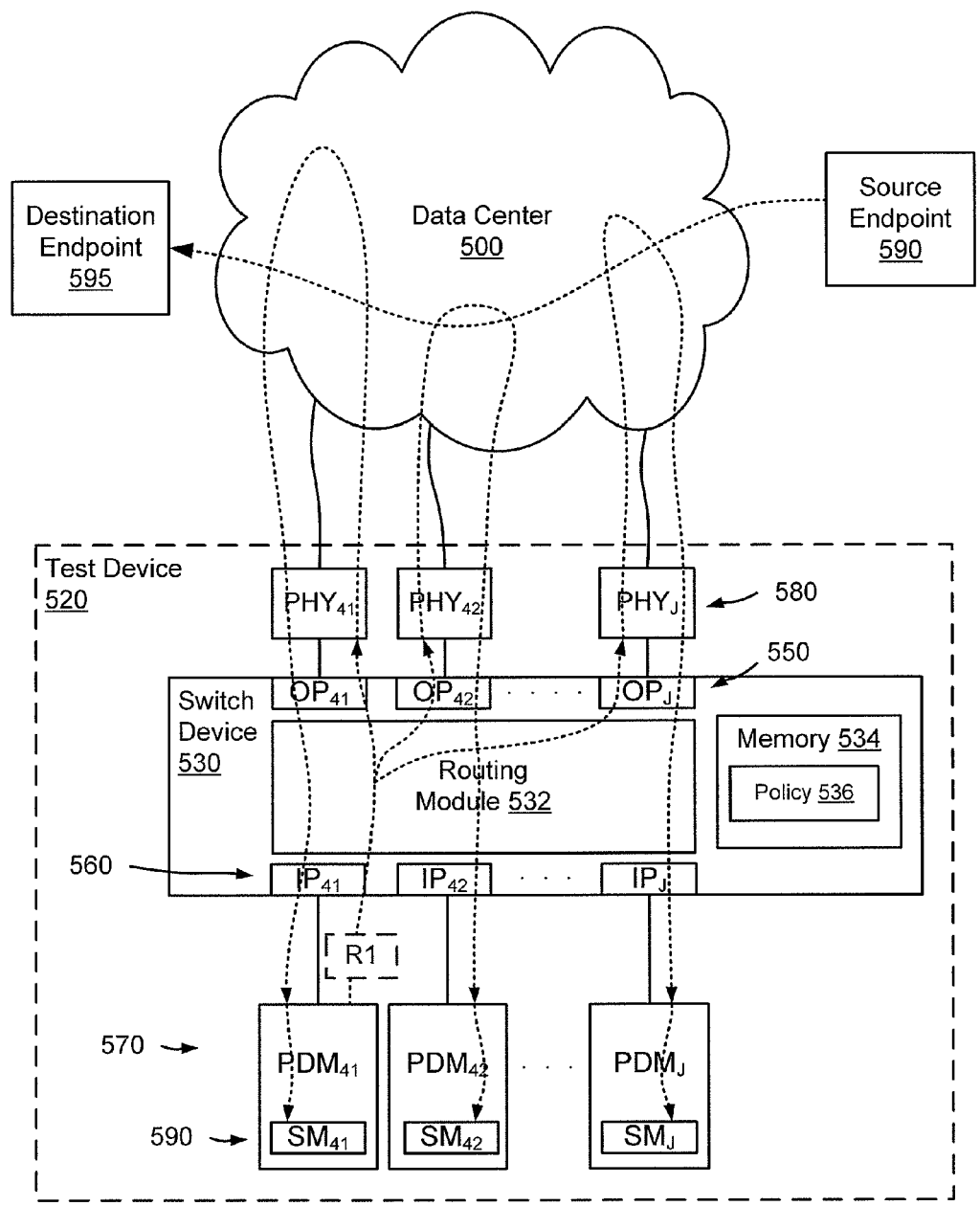
FIG. 5 is a schematic diagram that illustrates a test device configured to multi-cast a test packet to a data center, according to an embodiment.

FIG. 5 is a schematic diagram that illustrates a test device 520 configured to multi-cast a test packet R1 to a data center 500, according to an embodiment. The test device 520 can be configured to define and/or send test packets to the data center 500. The test device 520 is also configured to receive and/or analyze the test packets after the test packets have been processed at the data center 500. The test device 520 includes a switch device 530 and packet generation modules $PDM_{41}$ through $PDM_J$ (collectively can be referred to as packet generation modules 570). Each of the packet generation modules 570 are operably coupled to the switch device 530 via ports $IP_{41}$ through $IP_J$ (collectively can be referred to as ports 560). Each of the packet generation modules 570 includes one of stream modules 590. The stream modules 590 include stream module $SK_{41}$ through stream module $SM_J$. The switch device 530 is operably coupled to the data center 500, which is a device-under-test, via ports $OP_{41}$ through $OP_J$ (collectively can be referred to as ports 550).

In this embodiment, the routing module 532 is configured to route a test packet defined at one or more of the packet generation modules 570 to the data center 500. For example, the routing module 532 can be configured to route one or more test packets to a specified portion of the data center 500 based on a classification of the test packet(s) (e.g., a routing classification based on a portion of the test packet(s)). The classification can be based on a policy 536 (e.g., a routing policy) stored in memory 534. In some embodiments, at least a portion of the policy 536 can be a routing policy stored in the memory 534.

In some embodiments, processing within the data center 500 can be based on cells (e.g., fixed-size cells, variable-sized cells). For example, one or more test packets defined at the test device 520 can be sent to the data center 500. The data center 500 can be configured to parse (and/or combine) the test packets into cells that can be transmitted within, for example, a switch fabric of the data center 500. The cells can be reassembled into test packets before being sent back to the test device 520 (or another test device (not shown)) for analysis. In some embodiments, the test device 520 can be configured to parse (and/or combine) one or more test packets into one or more cells before the sending the cell(s) to the data center 500. In some embodiments, the test device 520 can also be configured to reconstruct the test packet(s) from the cell(s).

In some embodiments, the routing module 532 can be configured to route a test packet through one or more of the ports 550 (e.g., a subset of the ports 550, all of the ports 550) to the data center 500. As shown in FIG. 5, the routing module 532 is configured to multi-cast the test packet R1 (e.g., copies of the test packet R1) to the data center 500 via port $OI_{41}$, port $OP_{42}$, and port $OP_J$ based on the policy 536. By multi-casting one or more test packets to the data center 500 based on the policy 536, the flow rate of test network traffic sent to the data center 500 can be multiplied. In this embodiment, the flow rate of test network traffic that would be generated by test packet R1, if only uni-cast to the data center 500, is multiplied three-fold through multi-casting. In some embodiments, the routing module 532 can be configured to broadcast one or more test packets through the ports 550 to the data center 500.

In some embodiments, the routing module 532 can be configured to modify one or more test packets being routed at the routing module 532 before transmitting the test packet(s) to the data center 500. For example, the routing module 532 can be configured to modify one or more bit values (e.g., bit values in a field, bit values of an address value, bit values of a payload) of test packets being routed at the routing module 532 before the test packet(s) are sent to the data center 500 from the switch device 530. In some embodiments, the routing module 532 can be configured to modify the test packet(s) based on at least a portion of the policy 536. For example, the routing module 532 can be configured to modify a destination address value included in each copy of the test packet R1 being multi-cast from the switch device 530.

As shown in FIG. 5, the switch device 530 is operably coupled to the data center 500 via physical-layer-interface devices $PHY_{41}$ through $PHY_J$ (collectively can be referred to as physical ports 580). The physical-layer-interface device 580 can be configured to convert a signal defined based on a first platform (e.g., protocol) into a signal defined based on a second platform (e.g., protocol) different than the first platform. The first platform can be associated with, for example, the switch device 530 and the second platform can be associated with the data center 500. For example, if the data center 500 is configured to process signals based on an fiber optic protocol (e.g., fiber channel protocol (FCP)) and the switch device 530 is configured to process signals based on an Ethernet protocol, the physical-layer-interface device 580 can be configured to convert a stream of bit values transmitted from the switch device 530 from the Ethernet protocol into an optical signal that can be processed by the data center 500.

As shown in FIG. 5, the routing module 532 is configured to forward the copies of the test packet R1 in the ingress direction that have been processed at the data center 500 to the stream modules 590 of the packet generation modules 570 for processing. For example, the stream module $SM_{42}$ included in packet generation modules $PDM_{42}$ can be configured to receive and analyze a copy of the test packet R1 (and a test stream associated with the copy of the test packet R1) received at the stream module $SM_{42}$. In some embodiments, one or more of the copies of the test packet R1 can be processed based on, for example, the flowchart shown in FIG. 4.

In some embodiments, one or more copies of the test packet R1 (or other test packets) can be routed using the routing module 532 (in a manner different than the forwarding shown in FIG. 5). For example, a copy of the test packet R1 can be received at port $OP_{41}$ and routed (or forwarded) via port $IP_{42}$ to stream module $SM_{42}$ by the routing module 532. The routing module 532 can be configured to route (or forward) the copy of the test packet R1 based on a policy (e.g., a routing policy). In some embodiments, one or more test packets defined at test device 520 can be sent to the data center 500 and routed to a different test device (not shown).

As shown in FIG. 5, in some embodiments, stateful test traffic (or actual stateful traffic) can be sent from a source endpoint 590 (e.g., a server node device, a compute node device, a storage node device, a router) to a destination endpoint 595 (e.g., a server node device, a compute node device, a storage node device, a router) through the data center 500 while test network traffic is being sent to the data center 500 from the test device 520. In some embodiments, the test network traffic can function as background traffic to the stateful test traffic. The stateful test traffic can be, for example, higher layer traffic (e.g., layer-4 of the OSI model and above) and the background traffic can be lower layer routing traffic (e.g., layer-3 of the OSI model and below). One or more packet generation modules (or similar devices) can be used to analyze the capability of the data center 500 to process the stateful test traffic concurrently with the background traffic (by listening to and/or analyzing the stateful test traffic and/or the background traffic).

In some embodiments, background traffic can be sent from a source endpoint 590 (e.g., a server node device, a compute node device, a storage node device, a router) to a destination endpoint 595 (e.g., a server node device, a compute node device, a storage node device, a router) through the data center 500 while stateful test traffic is being sent to the data center 500 from the test device 520. In some embodiments, the test network traffic can function as background traffic to the stateful test traffic. One or more packet generation modules (or similar devices) can be used to analyze the capability of the data center 500 to process the stateful test traffic concurrently with the background traffic (by listening to and/or analyzing the stateful test traffic and/or the background traffic).

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a packet generation module (or a test device) can include multiple stream modules, and/or a stream module can be configured to process more than one test stream in parallel.

What is claimed is:

1. A non-transitory processor-readable medium storing code representing instructions that when executed by a processor cause the processor to:
    store a set of stream signatures representing a set of test streams;
    receive at a test device a stream signature from a test packet after the test packet has been processed at a device-under-test, the test packet emulating at least a portion of network traffic;
    define an indicator representing that the test packet is from a new test stream when the stream signature from the test packet is different than each stream signature from the set of stream signatures;
    extract a plurality of sequence values from a plurality of test packets defining the new test stream, the test packet being included in the plurality of test packets; and
    update a state value representing a state of the new test stream based on an order that each sequence value from the plurality of sequence values is received.

2. The non-transitory processor-readable medium of claim 1, wherein the test packet is a first test packet,
    the processor-readable medium further storing code representing instructions that when executed by a processor cause the processor to:
    store a sequence value from the first test packet;
    receive a second test packet; and
    replace the sequence value from the first test packet with a sequence value from the second test packet in response to a stream signature from the second test packet being matched with the stream signature from the first test packet.

3. The non-transitory processor-readable medium of claim 1, wherein the new test stream is defined by a plurality of test packets, the test packet is included in the plurality of test packets,
    the processor-readable medium further storing code representing instructions that when executed by a processor cause the processor to:
    define an indicator representing that a processing error has occurred at the device-under-test based on an order of a plurality of sequence values extracted from the plurality of test packets.

4. The non-transitory processor-readable medium of claim 1, wherein the stream signature includes an identifier representing an origin of the test packet.

5. The non-transitory processor-readable medium of claim 1, wherein the test packet is a first test packet,
    the processor-readable medium further storing code representing instructions that when executed by a processor cause the processor to:
    determine an expected sequence value based on a sequence value from the first test packet;
    receive a second test packet from the new test stream; and
    define an indicator representing that a processing error has occurred at the device-under-test based on a sequence value from the second test packet being different than the expected sequence value.

6. The non-transitory processor-readable medium of claim 1, wherein the test packet is an initial indicator of the new test stream.

7. The non-transitory processor-readable medium of claim 1, wherein the test device is a destination test device,
    the processor-readable medium further storing code representing instructions that when executed by a processor cause the processor to:
    identify the new test stream without receiving an indicator from a source test device that the test packet was defined at the source test device.

8. A non-transitory processor-readable medium storing code representing instructions that when executed by a processor cause the processor to:
    receive an origin identifier from a test packet after the test packet has been processed at a device-under-test, the origin identifier representing a location where the test packet was defined, the test packet emulating at least a portion of network traffic;
    define an indicator representing that the test packet is associated with a new test stream when the origin identifier of the test packet is excluded from a set of origin identifiers associated with a set of existing test streams;
    receive a sequence value from the test packet; and
    store the sequence value and the origin identifier in a database, the sequence value and the origin identifier collectively defining a state of the new test stream.

9. The non-transitory processor-readable medium of claim 8, wherein at least a portion of the new test stream is defined by a plurality of test packets, the test packet is included in the plurality of test packets,
    the processor-readable medium further storing code representing instructions that when executed by a processor cause the processor to:
    receive a series of sequence values associated with the plurality of test packets; and
    define an indicator representing that the plurality of test packets has been misprocessed at the device-under-test when a gap in the series of sequence values is detected.

10. The non-transitory processor-readable medium of claim 8, wherein the origin identifier is received at a first test device, the location is associated with a second test device separate from the first test device.

11. The non-transitory processor-readable medium of claim 8, wherein the origin identifier is a first origin identifier received at a test device, the test packet is an ingress test packet,
    the processor-readable medium further storing code representing instructions that when executed by a processor cause the processor to:

define an egress test packet that includes a second origin identifier representing the test device as an origin of the egress test packet; and send the egress test packet from the test device to the device-under-test.

12. The non-transitory processor-readable medium of claim 8, wherein the test packet is a first test packet, the processor-readable medium further storing code representing instructions that when executed by a processor cause the processor to:

receive a second test packet; and replace the sequence value from the first test packet with a sequence value from the second test packet in response to a stream signature from the second test packet being matched with the stream signature from the first test packet.

13. An apparatus, comprising:

a set of test devices configured to receive from a device-under-test a plurality of test packets, the set of test devices including a test device configured to receive a stream signature from a test packet from the plurality of test packets that emulates at least a portion of network traffic, the test device configured to determine that a portion of the plurality of test packets define a new test stream based on the stream signature of the test packet being different than each stream signature from a set of stream signatures stored locally at the test device, the test device having a plurality of general purpose processing modules and a switch device, the test device configured such that the portion of the plurality of test packets are forwarded to a general purpose processing module from the plurality of general purpose processing modules via the switch device, the test device configured to determine that the portion of the plurality of the test packets define the new test stream at the general purpose processing module.

14. The apparatus of claim 13, wherein the portion of the plurality of test packets is a first portion of the plurality of test packets, the test device is a first test device configured to receive the first portion of the plurality of test packets via a first link between the first test device and the device-under-test, the set of test devices includes a second test device configured to receive a second portion of the plurality of test packets defining a second test stream via a second link between the second test device and the device-under-test, the second link being logically parallel to the first link.

15. The apparatus of claim 13, wherein the plurality of test packets is a plurality of ingress test packets, the test device has a packet generation module configured to define an egress test packet configured to emulate at least a portion of network traffic, the test device is configured to send the egress test packet to the device-under-test.

16. The apparatus of claim 13, wherein the set of test devices is a first set of test devices, the plurality of test packets are sent to the device-under-test from a second set of test devices, the first set of test devices includes the test device, the test device is excluded from the second set of test devices.

17. The apparatus of claim 13, wherein the device-under-test is a multi-stage switch fabric defining at least a portion of a data center core.

18. The apparatus of claim 13, wherein the device-under-test is a multi-stage switch fabric defined based on a Clos architecture.

19. The apparatus of claim 13, wherein:

the plurality of test packets includes a first test packet and a second test packet, the switch device configured to receive the first test packet and the second test packet, the switch device configured to store a sequence value from the first test packet, the switch device configured to replace the sequence value from the first test packet with a sequence value from the second test packet in response to a stream signature from the second test packet being matched with the stream signature from the first test packet.

* * * * *